June 26, 1928.

S. D. HARTOG 1,675,174

PISTON

Filed Aug. 28, 1925

Inventor:
Stephen D. Hartog,
By Rippey Kingsland
His Attorneys.

Patented June 26, 1928.

1,675,174

UNITED STATES PATENT OFFICE.

STEPHEN D. HARTOG, OF ST. LOUIS, MISSOURI.

PISTON.

Application filed August 28, 1925. Serial No. 53,063.

This invention relates to pistons for internal combustion engines.

An object of the invention is to provide an improved piston for internal combustion engines comprising a head portion and piston pin bosses integrally supported from the head portion, in combination with lateral thrust portions separated from the head portion by a heat insulating space whereby said thrust portions are rendered free from the influence of the heat of the head portion, and means for supporting the thrust portions from the piston pin bosses.

Another object of the invention is to provide an improved piston for internal combustion engines embodying an improved construction in which a guide portion for the piston below the piston pin bosses is rendered free from the influence of heat to which the head of the piston is subjected by separating spaces, so that the thrust portions of the piston in connection with said guide portion thereof accomplish their intended functions without binding, leaving the piston freely operative in the cylinder.

Another object of the invention is to provide an improved piston for internal combustion engines in which the piston pin bosses are integrally supported from the head of the piston by a strengthening reinforcing structure and in which piston guide and thrust portions are provided, separated from the head of the piston by heat insulating spaces, and in which the thrust portions of the piston are provided with structure resisting expansion tending to bind the piston in the cylinder.

Another object of the invention is to produce a very light and efficient piston embodying novel structure to obtain all of the objects made apparent herein, reference being made to the accompanying drawing in which Fig. 1 is a side elevation of my improved piston looking into one of the piston pin bosses.

Figure 1:
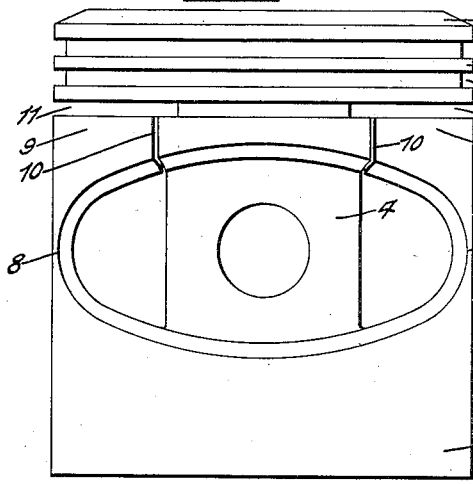
Figure 2:
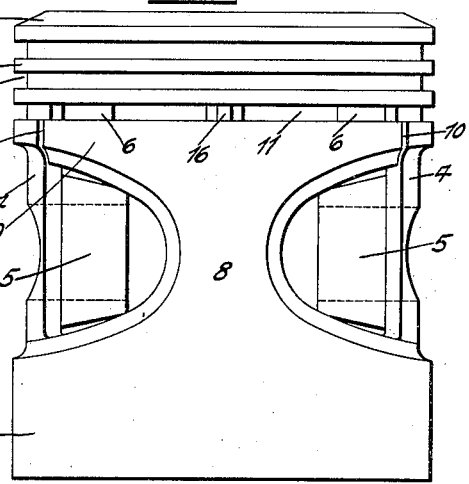
Fig. 2 is a side elevation around 90° from the elevation of Fig. 1.
Figure 3:
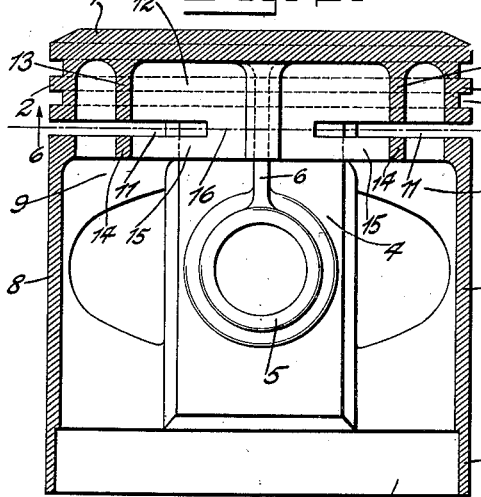
Fig. 3 is a vertical transverse sectional view at right angles to the plane of the piston pin bosses, on the line 3—3 of Fig. 5.
Figure 4:
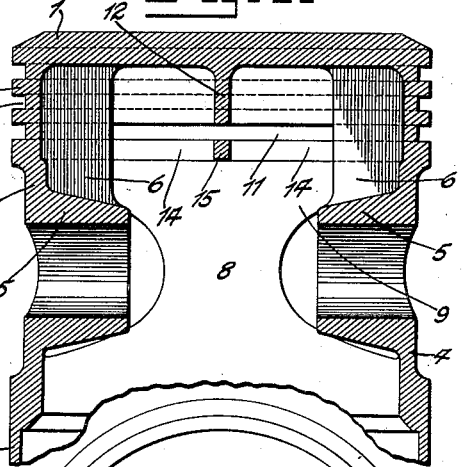
Fig. 4 is a vertical sectional view through the piston pin bosses on the line 4—4 of Fig. 6.
Figure 5:
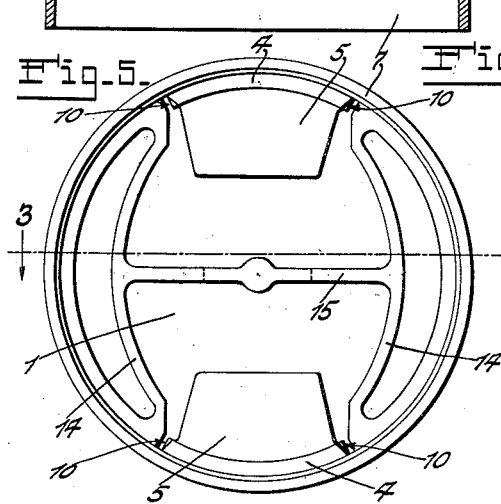
Fig. 5 is a lower end elevation of the piston.

The head 1 of the piston is of appropriate contour and is integral with an annular depending portion 2 in which the piston ring grooves 3 are formed. The annular depending portion 2 is of comparatively short length and is formed integral with diametrically opposite depending arms 4, the outer surfaces of which are of shorter radii of curvature than the radius of the part 2 of the piston so that said arms 4 do not contact with the cylinder. Piston pin bosses 5 are integral with the arms 4 and the structure is strengthened by webs or flanges 6 forming integral union with the head 1, the annular portion 2, the arms 4 and the bosses 5.

An annular piston guide portion 7 is formed integral with the lower ends of the arms 4 below the planes of the openings in the piston pin bosses. Diametrically opposite integral thrust portions 8 rise from the piston guide portion 7 at angles of 90° around from the axes of the piston pin bosses and the upper end of each of said thrust portions is formed with an integral arcuate portion 9, the ends of which are separated from the side edges of the arms 4 by heat insulating spaces 10, and from the lower end of the annular portion 2 of the head by heat insulating spaces 11 which prevent the said portions 9 from responding to the influence of heat of the head and arms 4 of the piston.

Figure 6:
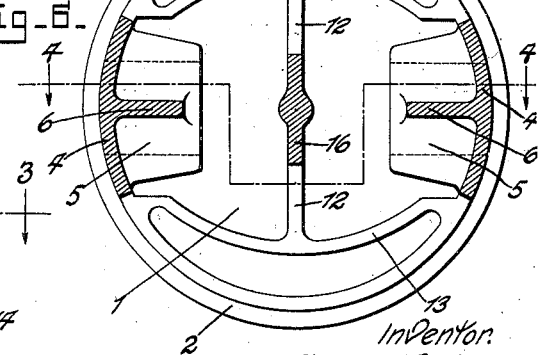
Fig. 6 is a sectional view on the line 6—6 of Fig. 3.

The lower side of the head 1 of the piston integrally supports a depending flange 12 extending transversely of the plane of the axis of the piston pin bosses, but terminating short of the annular portion 2 (Fig. 6). The ends of the flange 12 are integrally connected with the annular portion 2 of the head of the piston by arcuate flanges 13 formed on longer radii of curvature than the radius of curvature of the annular portion 2 and tending to resist radial expansion of the head of the piston. The flanges 13 are also integral with the head 1.

The ends of the respective arcuate portions 9 above the plane of the piston pin bosses are connected by webs 14 which, as shown, are on the same radii of curvature as flanges 13 and are spaced from the flanges 13 by the full width of the space 11. The two webs 14 are integrally united by a cross connection 15 in the plane of the flange 12 but having its outer ends spaced from the flange 12 by the full width of the space 11 and its central portion united with the flange 12 by an integral connection 16.

From the foregoing it will be seen that my invention very efficiently accomplishes all of its intended objects and purposes and avoids objections and deficiencies to which many types of pistons are subject. The specific construction and relationship of many of the parts of the piston may be varied, as may the material of which the piston is made.

I do not restrict myself in these or other unessential particulars, but what I claim and desire to secure by Letters Patent is:—

1. A piston comprising a head, a pair of diametrically opposite depending arms integral with said head, piston pin bosses extending inwardly from said arms, an annular guide portion integral with said arms below the planes of said piston pin bosses and being continuously integral throughout its circumference, a pair of diametrically opposite T-shaped arcuate portions supported by said guide portion between said arms and having their upper edges spaced from said head and their ends spaced from said arms, and a web connecting one part of each of said arcuate portions with another part of the same arcuate portion and being intermediately spaced from said arcuate portion.

2. A piston comprising a head, a pair of diametrically opposite depending arms integral with said head, piston pin bosses extending inwardly from said arms, an annular guide portion integral with said arms below the planes of said piston pin bosses and being continuously integral throughout its circumference, a pair of arcuate portions supported by said guide portion between said arms and having their upper edges spaced from said head and their ends spaced from said arms, and webs integrally connecting the ends of said arcuate portions respectively.

3. A piston comprising a head, a pair of diametrically opposite depending arms integral with said head, piston pin bosses extending inwardly from said arms, an annular guide portion integral with said arms below the planes of said piston pin bosses and being continuously integral throughout its circumference, a pair of arcuate portions supported by said guide portion between said arms and having their upper edges spaced from said head and their ends spaced from said arms, webs integrally connecting the ends of said arcuate portions respectively, and a cross connection integrally uniting said webs.

4. A piston comprising a head, a pair of diametrically opposite depending arms integral with said head, piston pin bosses extending inwardly from said arms, an annular guide portion integral with said arms below the planes of said piston pin bosses and being continuously integral throughout its circumference, a pair of approximately T-shaped arcuate portions supported by said guide portion between said arms and having their upper edges spaced from said head and their ends spaced from said arms, webs integrally connecting the ends of said arcuate portions respectively, and a cross connection integrally uniting said webs and having integral connection with the central portion of said head.

5. A piston comprising a head, an integral annular wall depending from said head, a pair of diametrically opposite arms depending from said wall, piston pin bosses extending inwardly from said arms, an annular guide portion integral with said arms below the planes of said bosses, thrust portions integrally united with said guide portion and extending upwardly between said arms, an arcuate portion integral with the upper end of each of said thrust portions and having their upper edges spaced from said annular wall and their ends spaced from said arms, a web connecting one part with another part of each of said arcuate portions and being intermediately spaced from said arcuate portions, and a connection between said webs.

6. A piston comprising a head, an integral annular wall depending from said head, a pair of diametrically opposite arms depending from said wall having outer peripheral surfaces on shorter radii of curvature than said wall, piston pin bosses extending inwardly from said arms, an annular guide portion of approximately the same diameter as said wall integral with said arms below the planes of said bosses, thrust portions integrally united with said guide portion and extending upwardly between said arms, an arcuate portion integral with the upper end of each of said thrust portions and having their upper edges spaced from said annular wall and their ends spaced from said arms, and webs integrally connecting the ends of said arcuate portions respectively.

7. A piston comprising a head, an integral annular wall depending from said head, a pair of diametrically opposite arms depending from said wall, piston pin bosses extending inwardly from said arms, an annular guide portion integral with said arms below the planes of said bosses, thrust portions integrally united with said guide portion and extending upwardly between said arms, an arcuate portion integral with the upper end of each of said thrust portions and having their upper edges spaced from said annular wall and their ends spaced from said arms, and webs integrally connecting the ends of said arcuate portions respectively, said webs being on longer radii of curvature than the radius of curvature of said annular wall.

8. A piston comprising a head, an integral annular wall depending from said head, a pair of diametrically opposite arms depending from said wall, piston pin bosses extending inwardly from said arms, an annular guide portion integral with said arms below the planes of said bosses, thrust portions integrally united with said guide portion and extending upwardly between said arms, an arcuate portion integral with the upper end of each of said thrust portions and having their upper edges spaced from said annular wall and their ends spaced from said arms, webs integrally connecting the ends of said arcuate portions respectively, and a cross connection integrally uniting said webs.

9. A piston comprising a head, an integral annular wall depending from said head, a pair of diametrically opposite arms depending from said wall, piston pin bosses extending inwardly from said arms, an annular guide portion integral with said arms below the planes of said bosses, thrust portions integrally united with said guide portion and extending upwardly between said arms, an arcuate portion integral with the upper end of each of said thrust portions and having their upper edges spaced from said annular wall and their ends spaced from said arms, webs integrally connecting the ends of said arcuate portions respectively, and arcuate flanges having their ends integrally united with said annular wall adjacent to the union of said arms with said annular wall.

10. A piston comprising a head, an integral annular wall depending from said head, a pair of diametrically opposite arms depending from said wall, piston pin bosses extending inwardly from said arms, an annular guide portion integral with said arms below the planes of said bosses, thrust portions integrally united with said guide portion and extending upwardly between said arms, an arcuate portion integral with the upper end of each of said thrust portions and having their upper edges spaced from said annular wall and their ends spaced from said arms, webs integrally connecting the ends of said arcuate portions respectively, and arcuate flanges having their ends integrally united with said annular wall adjacent to the union of said arms with said annular wall, and spaced from said webs.

11. A piston comprising a head, a pair of diametrically opposite depending arms having integral connection with said head, piston pin bosses supported by said arms, a complete annular guide portion integral with said arms below said bosses, thrust portions rising integrally from said guide portion and spaced from said head and from said arms, a connection integral with said head, and means connecting said connection with each of said thrust portions at a number of spaced points.

12. A piston comprising a head, a pair of diametrically opposite depending arms having integral connection with said head, piston pin bosses supported by said arms, a complete annular guide portion integral with said arms below said bosses, thrust portions rising integrally from said guide portion and spaced from said head and from said arms and having notches in their side edges in the plane of said bosses, and an integral connection between spaced portions of the upper end of each of said thrust portions and the central portion of said head.

13. A piston comprising a head, an annular wall depending from said head, a pair of diametrically opposite depending arms having integral connection with said head, piston pin bosses on said arms, curved flanges depending integrally from said head and having integral connection with said annular wall adjacent to the union of said arms with said wall, and piston thrust portions having integral connection with said arms below said bosses and being spaced from said arms in and above the plane of said bosses.

14. A piston comprising a head, an annular wall depending from said head, a pair of diametrically opposite depending arms having integral connection with said head and having outer peripheral surfaces on shorter radii of curvature than said wall, piston pin bosses on said arms, curved flanges depending integrally from said head and having integral connection with said annular wall adjacent to the union of said arms with said wall, and piston thrust portions having integral connection with said arms below said bosses and being spaced from said arms in and above the plane of said bosses and having their upper ends spaced from said annular wall.

15. A piston comprising a head, an annular wall integral with the head, a pair of diametrically opposite depending arms integrally united with said wall, piston pin bosses in connection with said arms, a guide portion integral with said arms below the planes of said bosses, side thrust portions rising integrally from said guide portion and lengthening circumferentially toward their upper ends and being disconnected from said annular wall and from said arms above the planes of said piston pin bosses, and a connection integrally uniting spaced portions of the upper ends of said thrust portions respectively with each other.

16. A piston comprising a head, an annular wall integral with the head, a pair of diametrically opposite depending arms integrally united with said wall, piston pin bosses in connection with said arms, a guide portion integral with said arms below the planes of said bosses, side thrust portions rising integrally from said guide portion and lengthening circumferentially toward their upper ends and being disconnected from said annular wall and from said arms above the planes of said piston pin bosses, and a connection integrally uniting spaced portions of the upper ends of said thrust portions respectively with the central portion of said head.

17. A piston comprising a head, an integral annular wall depending from said head, diametrically opposite depending arms integral with said wall and said head, piston pin bosses integral with said arms, side thrust portions integrally connected with said arms below the planes of the openings through said bosses and disconnected from said arms and from said annular wall above the planes of said bosses and lengthening circumferentially toward their upper ends, and a connection integrally uniting spaced portions of said thrust portions respectively above the planes of said bosses.

18. A piston comprising a head, an integral annular wall depending from said head, diametrically opposite depending arms integral with said wall and said head, piston pin bosses integral with said arms, side thrust portions integrally connected with said arms below the planes of the openings through said bosses and disconnected from said arms and from said annular wall above the planes of said bosses, and a connection integrally uniting spaced parts of each thrust portion and each thrust portion with the other and with the central portion of said head above the planes of said bosses.

19. A piston comprising a head, an integral annular wall depending from said head, diametrically opposite depending arms integral with said wall and said head, piston pin bosses integral with said arms, side thrust portions integrally connected with said arms below the planes of the openings through said bosses and disconnected from said arms and from said annular wall above the planes of said bosses, a connection integrally uniting said thrust portions with each other and with the central portion of said head above the planes of said bosses, and a connection integrally uniting opposite portions of said wall with each other.

20. A piston comprising a head, an annular wall depending from said head, diametrically opposite depending arms integral with said wall and having peripheral surfaces on shorter radii of curvature than adjacent portions of the piston, piston pin bosses supported by said arms, depending flanges integral with said head and having their ends integrally united with said wall adjacent to the planes of the side edges of said arms, and a depending flange integral with said head extending transversely of the plane of said piston pin bosses and having its ends integrally united with said first named flanges.

21. A piston comprising a head, an annular wall depending from said head, diametrically opposite depending arms integral with said wall and having outer peripheral surfaces on shorter radii of curvature than adjacent portions of the piston, piston pin bosses supported by said arms, depending flanges integral with said head and having their ends integrally united with said wall adjacent to the planes of the side edges of said arms, a depending flange integral with said head extending transversely of the plane of said piston pin bosses and having its ends integrally united with said first named flanges, a piston guide portion having integral connection with said arms below the planes of said piston pin bosses, and side thrust portions rising integrally from said guide portion and having their side edges disconnected from said arms.

22. A piston comprising a head, an annular wall depending from said head, diametrically opposite depending arms integral with said wall, piston pin bosses supported by said arms, depending flanges integral with said head and having their ends integrally united with said wall adjacent to the planes of the side edges of said arms, a depending flange integral with said head extending transversely of the plane of said piston pin bosses and having its ends integrally united with said first named flanges, a piston guide portion having integral connection with said arms below the planes of said piston pin bosses, and side thrust portions rising integrally from said guide portion and having their side edges disconnected from said arms and having their upper ends lengthening circumferentially and spaced from said annular wall.

23. A piston comprising a head, an annular wall depending from said head, diametrically opposite depending arms integral with said wall, piston pin bosses supported by said arms, depending flanges integral with said head and having their ends integrally united with said wall adjacent to the planes of the side edges of said arms, a depending flange integral with said head extending transversely of the plane of said piston pin bosses and having its ends integrally united with said first named flanges, a piston guide portion having integral connection with said arms below the planes of said piston pin bosses, side thrust portions rising integrally from said guide portion and having their side edges disconnected from said arms and having their upper ends spaced from said annular wall, and webs integrally connecting the side edges of said side thrust portions respectively above the planes of said piston pin bosses.

24. A piston comprising a head, an annular wall depending from said head, diametrically opposite depending arms integral with said wall, piston pin bosses supported by said arms, depending flanges integral with said head and having their ends integrally united with said wall adjacent to the planes of the side edges of said arms, a depending flange integral with said head extending transversely of the plane of said piston pin bosses and having its ends integrally united with said first named flanges, a piston guide portion having integral connection with said arms below the planes of said piston pin bosses, side thrust portions rising integrally from said guide portions and having their side edges disconnected from said arms and having their upper ends spaced from said annular wall, webs integrally connecting the side edges of said side thrust portions respectively above the planes of said piston pin bosses, and a cross connection integrally uniting said webs above the planes of said piston pin bosses.

25. A piston comprising a head, an annular wall depending from said head, diametrically opposite depending arms integral with said wall and having outer peripheral surfaces on shorter radii of curvature than adjacent portions of the piston, piston pin bosses supported by said arms, depending flanges integral with said head and having their ends integrally united with said wall adjacent to the planes of the side edges of said arms, a depending flange integral with said head extending transversely of the plane of said piston pin bosses and having its ends integrally united with said first named flanges, a piston guide portion having integral connection with said arms below the planes of said piston pin bosses, side thrust portions rising integrally from said guide portion and having their side edges disconnected from said arms and having their upper ends spaced from said annular wall, webs integrally connecting the side edges of said side thrust portions respectively above the planes of said piston pin bosses, and a cross connection integrally uniting said webs with each other and with the central portion of said head.

26. A piston comprising a head, an annular wall depending from said head, diametrically opposite depending arms integral with said wall, piston pin bosses supported by said arms, depending flanges integral with said head and having their ends integrally united with said wall adjacent to the planes of the side edges of said arms, a depending flange integral with said head extending transversely of the plane of said piston pin bosses and having its ends integrally united with said first named flanges, a piston guide portion having integral connection with said arms below the planes of said piston pin bosses, side thrust portions rising integrally from said guide portion and having their side edges disconnected from said arms and having their upper ends spaced from said annular wall, webs integrally connecting the side edges of said side thrust portions respectively above the planes of said piston pin bosses, a cross connection integrally uniting said webs with each other and with the central portion of said head, and flanges integrally uniting the spaced portions of said annular wall.

27. A piston comprising a head, a body spaced from the head and having downwardly extending slots at its upper end permitting expansion and contraction, piston pin bosses integrally united with the head and spaced from circumferentially adjacent portions of the body, and an internal rib structure integrally connecting the head with the body at spaced points between said slots on both sides of the piston pin bosses, the portions of said rib structure connecting said head and said body at opposite sides of said bosses being integrally united below the head and above the plane of said bosses.

28. A piston comprising a head, a body spaced from the head and having downwardly extending slots at its upper end permitting expansion and contraction, piston pin bosses integrally united with the head and spaced from circumferentially adjacent portions of the body, and an internal rib structure integral with the head and being connected with the body at a number of points at each side of the piston pin bosses and forming a transverse strut maintaining the body wall constantly in the form of a tensionally resilient cylinder.

STEPHEN D. HARTOG.